(12) United States Patent
Moidu et al.

(10) Patent No.: US 7,903,318 B2
(45) Date of Patent: Mar. 8, 2011

(54) MEMS MICROMIRROR DEVICES WITH ANTI-REFLECTIVE STRUCTURES

(75) Inventors: Abdul Jaleel K. Moidu, Nepean (CA); Paul Colbourne, Ottawa (CA); Keith Anderson, Ottawa (CA); John Michael Miller, Gatineau (CA)

(73) Assignee: JDS Uniphase Corporation, Milpitas, CA (US)

( * ) Notice: Subject to any disclaimer, the term of this patent is extended or adjusted under 35 U.S.C. 154(b) by 90 days.

(21) Appl. No.: 12/360,200

(22) Filed: Jan. 27, 2009

(65) Prior Publication Data

US 2009/0190202 A1      Jul. 30, 2009

Related U.S. Application Data

(60) Provisional application No. 61/024,224, filed on Jan. 29, 2008, provisional application No. 61/078,907, filed on Jul. 8, 2008.

(51) Int. Cl.
*G02B 26/00* (2006.01)

(52) U.S. Cl. ........................ 359/291; 359/566; 359/223.1; 353/99

(58) Field of Classification Search .......... 359/290–295, 359/297, 298, 214, 223, 223.1, 224, 566, 359/850; 355/53, 55, 67–69, 72; 372/68, 92, 98, 101, 103; 353/31, 33, 97–99; 430/22, 30; 250/492.1

See application file for complete search history.

(56) References Cited

U.S. PATENT DOCUMENTS

| | | | |
|---|---|---|---|
| 6,061,166 A * | 5/2000 | Furlani et al. ................. | 359/254 |
| 6,810,176 B2 * | 10/2004 | Frick et al. ...................... | 385/37 |
| 6,844,959 B2 | 1/2005 | Huibers et al. ................ | 359/297 |
| 7,167,613 B2 | 1/2007 | Miller et al. .................... | 385/18 |

* cited by examiner

*Primary Examiner* — Loha Ben
(74) *Attorney, Agent, or Firm* — Teitelbaum & Maclean; Neil Teitelbaum; Doug MacLean

(57) ABSTRACT

Diffractive patterns are disposed on a MEMS substrate in the gaps between the MEMS micromirrors to reduce backreflection of light leaking through the gaps and reflected by the MEMS substrate. The diffractive patterns are silicon surface-relief diffraction gratings or silicon oxide gratings on silicon substrate. Sub-wavelength gratings are used to suppress higher orders of diffraction; 50% duty cycle surface relief gratings on a substrate having index of refraction close to 3 are used to suppress both reflected and transmitted zero orders of diffraction simultaneously. The gratings have lines running parallel or at a slight angle to the gaps, to prevent the diffracted light from re-entering the gaps.

20 Claims, 6 Drawing Sheets

MEMS MICROMIRROR DEVICES WITH ANTI-REFLECTIVE STRUCTURES

CROSS-REFERENCE TO RELATED APPLICATIONS

The present invention claims priority from U.S. provisional application No. 61/024,224, filed Jan. 29, 2008, and U.S. provisional application No. 61/078,907, filed Jul. 8, 2008, which are incorporated herein by reference.

TECHNICAL FIELD

The present invention is related to micro-electro-mechanical systems (MEMS) micromirror devices, and in particular to improving optical performance of such devices.

BACKGROUND OF THE INVENTION

A micro-electromechanical system (MEMS) device is a micro-sized mechanical structure having electrical circuitry fabricated together with the device by using microfabrication processes mostly derived from integrated circuit fabrication processes. The developments in the field of MEMS process engineering allow for batch production of electrostatically tiltable MEMS micromirrors and micromirror arrays that can be used in such areas of photonics as visual displays, optical attenuators and switches, sensors with optical readout, and other devices. There are at least two main micromachining techniques used to manufacture MEMS micromirror devices.

One such technique is based on so called bulk micromachining, in which the whole thickness of a silicon wafer is used for building micro-mechanical structures. Silicon is machined using various etching processes. Anodic bonding of glass plates or additional silicon wafers is used for adding features in the third dimension and for hermetic encapsulation. Complex three-dimensional mechanical structures with mirror hinges disposed under the mirrors can be created using bulk micromachining. High fill factors defined as ratios of geometrical area occupied by the micromirrors to the total area of the array, can be achieved, allowing the creation of high-performance visual display pixel arrays. Detrimentally, the bulk micromachining techniques are very complex and require many process steps.

Another technique is based on so called surface micromachining, in which layers are deposited on the surface of a substrate as the structural materials to be patterned, instead of a three-dimensional processing of the substrate itself, which significantly simplifies the manufacturing processes involved. The original surface micromachining concept was based on thin polycrystalline silicon layers patterned as movable mechanical structures and released by sacrificial etching of an underlying oxide layer. This MEMS paradigm has enabled the manufacturing of low cost MEMS devices.

New etching technology of deep reactive ion etching (RIE) has made it possible to combine good performance typical to bulk micromachining with in-plane operation typical to surface micromachining. While it is common in surface micromachining to have structural layer thickness in the range of 2 $\mu m$, in high aspect ratio (HAR) micromachining the achievable thickness of MEMS devices is from 10 to 100 $\mu m$. The materials commonly used in HAR micromachining are thick polycrystalline silicon, known as epi-poly, and bonded silicon-on-insulator (SOI) wafers. This combined technology is quickly becoming the technology of choice for manufacturing MEMS micromirror devices.

A significant problem of utilizing either type of MEMS micromirror devices in visual display systems and, or in optical switching systems is related to presence of unwanted reflections from a fraction of the MEMS substrate not covered by the micromirrors. Due to technological and construction limitations, the fill factor of MEMS micromirror arrays, defined as MEMS micromirror area divided by the total MEMS substrate area, is less than unity. Inter-mirror gaps are required to prevent the micromirrors from touching or sticking to each other, and to prevent electrical cross-talk between the micromirrors. For some devices, the gaps are also required to accommodate the micromirror hinge structures. Due to presence of said gaps between MEMS micromirrors in an optical system, a fraction of light falling onto the micromirrors leaks through the gaps therebetween and reflects from the MEMS substrate, propagating back through the gaps and into the optical system. As a result, a background light is present in the system regardless of a tilt angle of a MEMS micromirror. This background light lowers achievable contrast ratio, that is, a ratio of "white" luminosity to "black" luminosity of a picture element of a picture generated by a MEMS visual display. The degradation occurs due to raising a level of "black" luminosity due to presence of the background light mentioned above. In case of an optical switch application of MEMS, the background light lowers achievable ON/OFF ratios and increases optical crosstalk, by leaking through in the "OFF" state of an optical switch. Thus, optical performance of a MEMS micromirror device is substantially degraded.

One approach aimed at improving the contrast ratio of a visual display consists in covering an area of a substrate under the gaps between the micromirrors with a light-absorbing material. This approach, dubbed in the visual display industry as a "black grid" approach, allows one to improve the contrast ratio of a picture generated by a display. For example, U.S. Pat. No. 6,844,959 in the name of Huibers et al., assigned to Reflectivity, Inc. and incorporated herein by reference, teaches such black grid structures for a MEMS spatial light modulator. One drawback of the black grid approach is related to the fact that most of black grid materials reflect some light falling thereon. Even so called "black chrome" material frequently used as a black grid material in liquid crystal displays has a residual reflectivity of about 3%, which may not be sufficient to completely remove the background light. Another drawback is that the absorbed light causes the black grid layer to heat up which creates undesired local temperature gradients, as well as raises the overall temperature of the MEMS substrate.

Another prior-art approach consists in using reflective cusps on the MEMS substrate, disposed in the gaps between the micromirrors in the micromirror array. The U.S. Pat. No. 7,167,613 in the name of Miller et al., assigned to JDS Uniphase Corporation and incorporated herein by reference, teaches using such cusps for an optical switch application. Turning to FIG. 1, a cross-section of a prior-art MEMS micromirror device 100 with inter-mirror gap reflection suppression is shown, having a substrate 102, a cusp 104, and micromirrors 106A and 106B. A beam of light 108 falls into a gap 110 between the micromirrors 106A and 106B and reflects from the cusp 104 towards the micromirror 106A as a light beam 112. The cusp 104 prevents the light beam 112 from exiting back through the gap 110, whereby the extinction ratio is improved and the optical cross-talk is reduced. One drawback of the cusps approach is that manufacturing of oblique-tilted reflective structures is not directly compatible with planar MEMS manufacturing technologies used to manufacture the rest of the MEMS micromirror device 100.

It is therefore a goal of the present invention to provide a MEMS micromirror device effectively suppressing unwanted reflections from the MEMS substrate, thereby improving the optical performance of the MEMS micromirror device. Importantly and advantageously, the backreflection suppressing features of the MEMS device of the present invention are manufactured by a process-compatible, inexpensive and a versatile method suitable for a broad variety of types of MEMS micromirror devices. Further, advantageously, the MEMS micromirror device according to the present invention can be constructed in a variety of configurations, so as to prevent the light falling into the gaps between the micromirrors from ever exiting said gaps, by making it scatter in a well controlled and predictable fashion in a desired one or more directions.

SUMMARY OF THE INVENTION

In accordance with the invention there is provided a MEMS micromirror device having a MEMS substrate comprising at least one layer, wherein the MEMS substrate has a top surface; a plurality of micromirrors for reflecting light impinging thereon, wherein said light has a central wavelength $\lambda_0$, wherein the micromirrors are supported by the MEMS substrate and disposed over the top surface of the MEMS substrate, and wherein gaps exist between the micromirrors; and a diffractive pattern for suppressing backreflection of light leaking through the gaps between the micromirrors and impinging onto the top surface of the MEMS substrate, by diffracting said leaking light, wherein the diffractive pattern is disposed on or within the top surface of the MEMS substrate, wherein said diffractive pattern covers at least 80% of an area formed by a normal projection of the gaps between the micromirrors onto the MEMS substrate.

The diffractive pattern suppresses said backreflection by directing the diffracted light away from the gaps, for example, by directing the diffracted light under the mirrors. The diffractive pattern has lines, or grooves, that run parallel to the inter-mirror gaps, perpendicular to them, or at an angle thereto. One- and two-dimensional groove patterns can be used. The diffractive pattern can be manufactured in the form of silicon oxide lines on a silicon substrate; alternatively, the diffractive pattern may be in the form of lines, or grooves, etched in the substrate itself, so as to form a surface relief grating on the substrate surface. According to the present invention, the diffractive pattern can also be made as a sub-wavelength grating, i.e. a grating having a feature size, such as a groove period, that is smaller than a wavelength of the light being diffracted. Preferably, such a structure has an effective optical thickness of $m\lambda_0/4$, wherein m is an integer odd number.

In one embodiment of the present invention, the diffractive pattern comprising a repeating or random pattern of "features" has a variable duty cycle defined as a ratio of a feature width to a feature period. The duty cycle varies across the lines of the diffractive pattern, so as to suppress said backreflection by directing the diffracted light away from the gaps between the micromirrors. In another embodiment of the invention, the refractive index and the diffractive pattern height are chosen so as to suppress at least one, either reflective or transmissive, zero order of diffraction, and preferably both said zero orders of diffraction simultaneously, whereby the diffracted light scatters into a first order of diffraction. Further, preferably, the MEMS substrate has a quarter-wave buried oxide layer that can be, for instance, a buried oxide layer of a silicon-on-insulator (SOI) substrate, so as to suppress the reflections of light from this buried oxide layer.

In accordance with another aspect of the invention there is further provided a method of manufacturing of a MEMS micromirror device, comprising:
(a) providing the MEMS substrate;
(b) growing a silicon oxide layer of a pre-determined thickness on said MEMS substrate;
(c) patterning and etching said silicon oxide layer, so as to create the diffractive pattern;
(d) masking the diffractive pattern using an overlayer mask on top of the diffractive pattern before processing the MEMS substrate any further; and
(e) fabricating the plurality of micromirrors and placing the micromirrors over the top surface of the MEMS substrate.

In accordance with another aspect of the present invention there is provided a method of manufacturing of a MEMS micromirror device, comprising:
(a) providing a silicon-on-insulator (SOI) substrate for use as the MEMS substrate, wherein said SOI substrate has a buried silicon oxide layer;
(b) etching the SOI substrate, so as to expose the buried silicon oxide layer;
(c) upon completion of step (b), patterning and etching said silicon oxide layer, so as to create the diffractive pattern; and
(d) fabricating the plurality of micromirrors and placing the micromirrors over the top surface of the MEMS substrate.

In accordance with yet another aspect of the present invention there is further provided a method of manufacturing of a MEMS micromirror device comprising:
(a) providing a first silicon layer;
(b) growing a silicon oxide layer of a pre-determined thickness on the top surface of the first silicon layer;
(c) patterning and etching said silicon oxide layer, so as to create the diffractive pattern on the top surface of the first silicon layer;
(d) bonding a second silicon layer to the silicon oxide layer, thereby forming a stack of the first silicon layer at a bottom of the stack, the silicon oxide layer, and the second silicon layer at a top of the stack;
(e) exposing the diffractive pattern by etching through the second silicon layer, thereby forming the MEMS substrate; and
(f) fabricating the plurality of micromirrors and placing the micromirrors over the top surface of the MEMS substrate.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art. In FIGS. 2A, 2B to FIG. 9, like numbers refer to like elements.

Figure 2A:
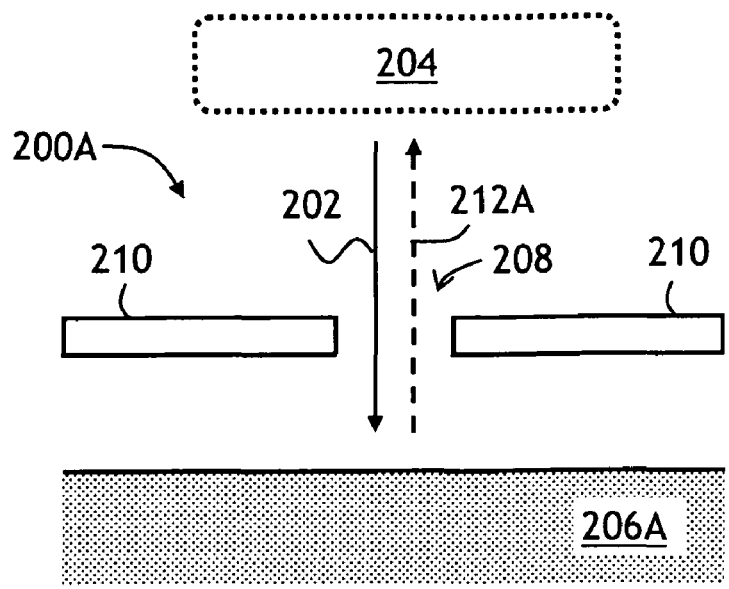
FIGS. 2A and 2B are cross-sectional side views of a MEMS micromirror device without (FIG. 2A) and with (FIG. 2B) a diffractive pattern of the present invention.

Referring to FIG. 2A, a problem solved by the present invention is illustrated by means of a cross-sectional view of a prior-art MEMS device 200A. In FIG. 2A, a light beam 202 from an optical system 204 reaches a MEMS substrate 206A through a gap 208 between the MEMS micromirrors 210 and is reflected back into the system 204 from the MEMS substrate 206A through the gap 208 as a beam 212A. Thus, an undesirable backreflection arises. The backreflected beam 212A degrades optical performance of the optical system 204.

Figure 2B:
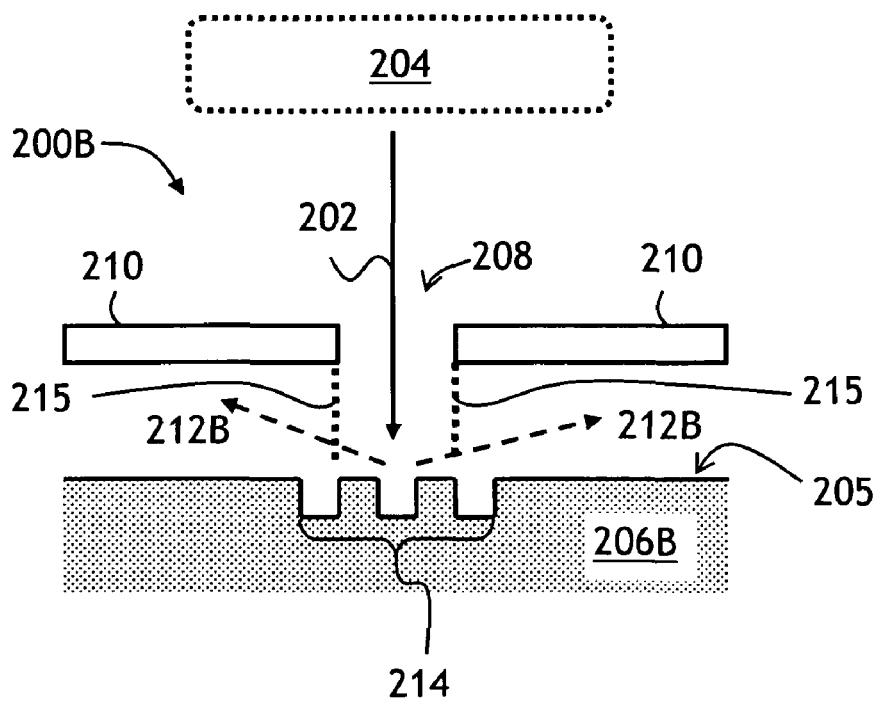

To solve the problem, according to the present invention, a diffraction pattern is introduced below mirror gaps. Turning now to FIG. 2B, a diffractive pattern 214 on a top surface 205 of a MEMS substrate 206B of a MEMS micromirror device 200B causes the beam 202 to diffract as beams 212B at such angles that the beams 212B do not return through the mirror gap 208. The diffraction pattern 214 encompasses an area formed by a normal projection, that is a straight-angle projection, of the gap 208 between the micromirrors 210 onto the MEMS substrate 206B as shown by dotted lines 215. Any light leaking between the micromirrors 210 will be diffracted by the diffractive pattern 214 and, therefore, no such light beam will reflect back into the optical system 204, whereby the goal of the present invention is achieved. In practice, covering about 80% or more of the area of the gap 208 is sufficient to effectively suppress the backreflection. The micromirrors 210 are supported by the MEMS substrate 206B, wherein the supports are not shown, and disposed over the top surface 205 of the MEMS substrate 206B.

The diffractive pattern 214 on the top surface 205 of the substrate 206B is shown in FIG. 2B as etched into the top surface 205, so as to form a surface-relief diffraction grating defined herein as a diffractive pattern having straight lines, on the top surface 205. Other types of diffractive patterns, and not necessarily surface-relief patterns but, for example, patterned oxide overlayers on a top surface of a MEMS substrate, with straight or curved lines, diamond patterns, or honeycomb patterns, will also work with this invention. It is to be understood that a diffractive pattern on a MEMS substrate surface, whether a surface relief pattern or a patterned overlayer or any other type of a diffractive pattern, is intended to be an essential element of the present invention. Some of particularly beneficial diffractive patterns will be described in detail below.

Throughout the specification, a term "surface" does not necessarily mean a "flat surface". A MEMS substrate may have, and often does have, a complex topography comprising electrodes, leads, micromirror supporting hinges, and the like.

Figure 3:
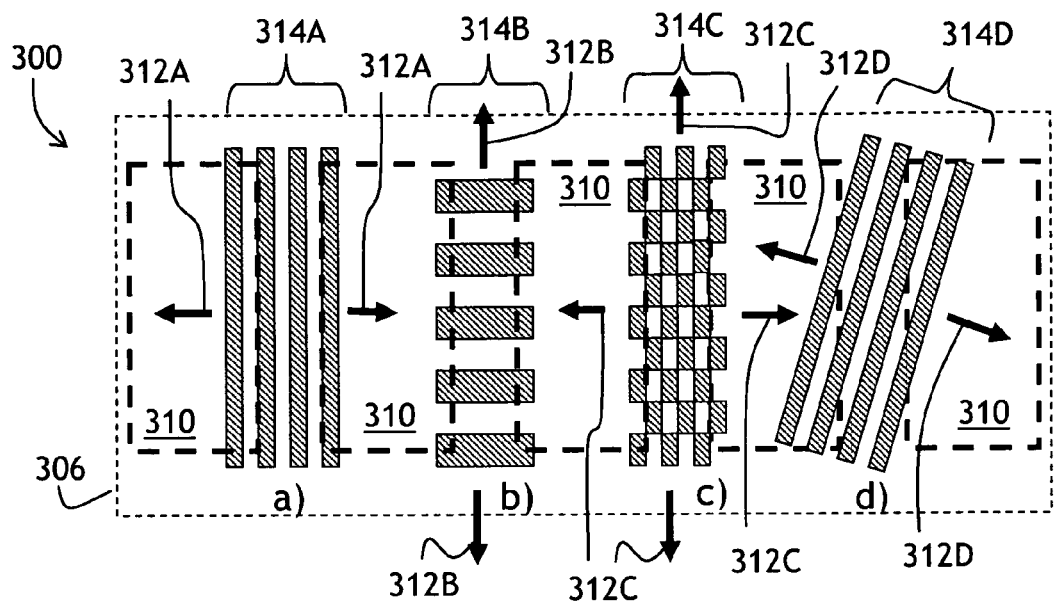
FIG. 3 is a plan view of preferred diffractive patterns according to the present invention.

Referring now to FIG. 3, preferable diffractive patterns for a MEMS mirror substrate are illustrated by means of a plan view of a MEMS micromirror device 300 having a MEMS substrate 306, micromirrors 310 shown as dashed transparent rectangles, and diffractive patterns 314A to 314D on the MEMS substrate 306, shown as shaded rectangle patterns. These patterns fall into four types: a) the one having lines running parallel to gaps between the mirrors 310, such as the diffractive pattern 314A; b) the one having lines running perpendicular to the gaps between the mirrors 310, such as the diffractive pattern 314B; c) the one having lines running both parallel to the gaps and lines running perpendicular to the gaps, so as to form a checkerboard pattern such as the diffractive pattern 314C; and d) the one having straight lines at a slight angle with respect to the gap between the mirrors 310, for example 10 degrees, such as the diffractive pattern 314D. The diffractive patterns 314A to 314D diffract light falling thereon in directions shown by arrows 312A to 312D, respectively. One advantage of the pattern 314D is that it is more tolerant with regard to slight misalignment between the micromirrors 310 and the diffraction pattern 314D than, for example, the diffraction pattern 314A.

For surface-relief diffraction patterns 314A to 314D, "lines" are grooves in the substrate 306, the grooves area being shown as shaded rectangles. The grooves have a rectangular cross section and a depth of $m\lambda_0/4$, wherein m is an integer odd number, and $\lambda_0$ is a central wavelength of light impinging onto the MEMS substrate 306. The grooves are etched in the substrate 306 to the required depth. Other shapes of a groove cross section, e.g. triangular or trapezoidal cross-section, will also work with the present invention. Furthermore, other diffractive patterns such as diamond shapes or hexagonal patterns or random patterns can also be used, for as long as the duty cycle is close to 50%, for maximum reduction of substrate reflections. The pattern 314A can contain only a few, two, or even one groove running parallel to a narrow inter-mirror gap.

The backreflection is suppressed due to destructive interference between reflected light from the etched and un-etched regions of the diffractive patterns 314A to 314D. When the etching depth is $m\lambda_0/4$, wherein m is an integer odd number, the difference in phase between light reflected from the etched and un-etched regions is $\lambda_0/2$, or 180° in phase units. When the areas occupied by the etched and un-etched regions are equal, that is, when the duty cycle is 50%, the electric fields from the two regions cancel each other, resulting in zero net reflection from the substrate for even diffraction orders, reflection straight back from the substrate corresponding to the zero order of diffraction. Of course, the reflected light must go somewhere, and therefore it diffracts at an angle as illustrated in FIG. 2B, according to the diffraction theory: $m\lambda_0=\Lambda(\sin(\theta_{out})-\sin(\theta_{in}))$, where m is the diffraction order (an odd integer), $\lambda_0$ is the central wavelength, $\Lambda$ is the period of the diffraction pattern, $\theta_{in}$ is the incident angle, and $\theta_{out}$ is the diffracted angle. The period $\Lambda$ of the diffraction patterns can be chosen such that the diffracted light does not interfere with the optical system, for example in FIG. 2B the period $\Lambda$ is such that the diffracted light does not return through the mirror gap 208 into the optical system 204.

Figure 1:
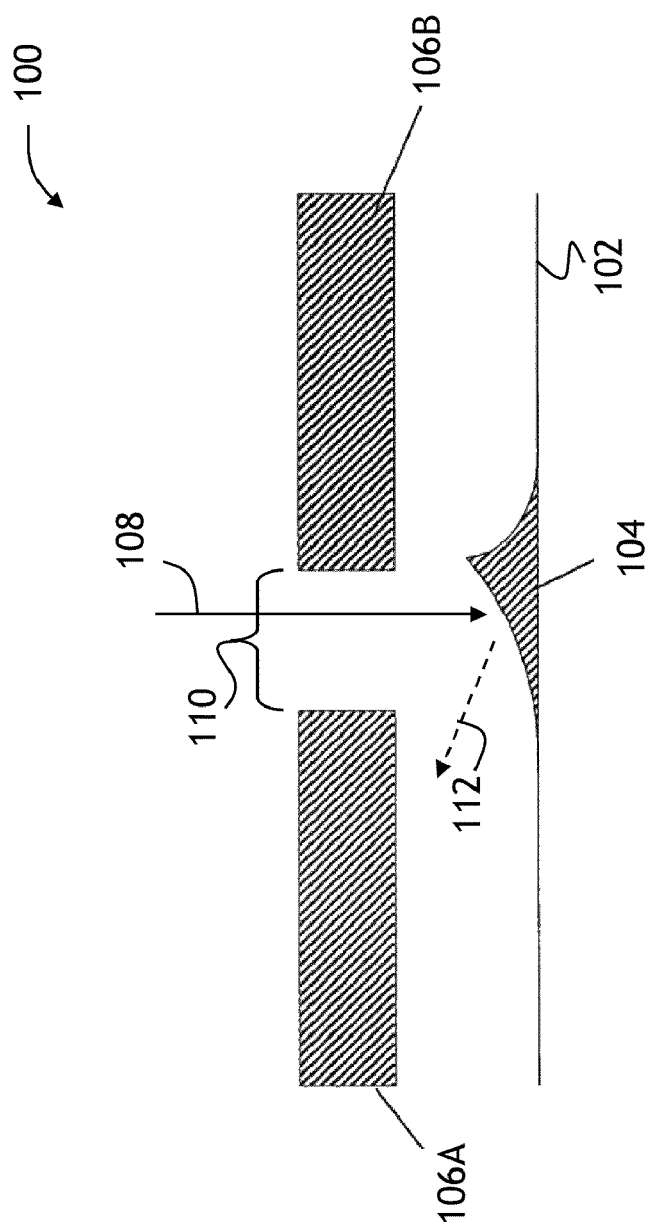
FIG. 1 is a schematic diagram showing a cross-section of a prior-art MEMS micromirror device with the inter-mirror gap reflection suppression.

A patterned etching to a uniform depth is a well-defined process in MEMS fabrication. Therefore, adding a step of etching binary diffractive patterns on a MEMS substrate does not considerably complicate the overall process of MEMS fabrication. This is an important advantage over the prior art device 100 shown in FIG. 1, since the obliquely tilted cusps 104 are much more difficult to fabricate than a simple binary pattern such as any of the patterns 314A to 314D.

Figure 4:
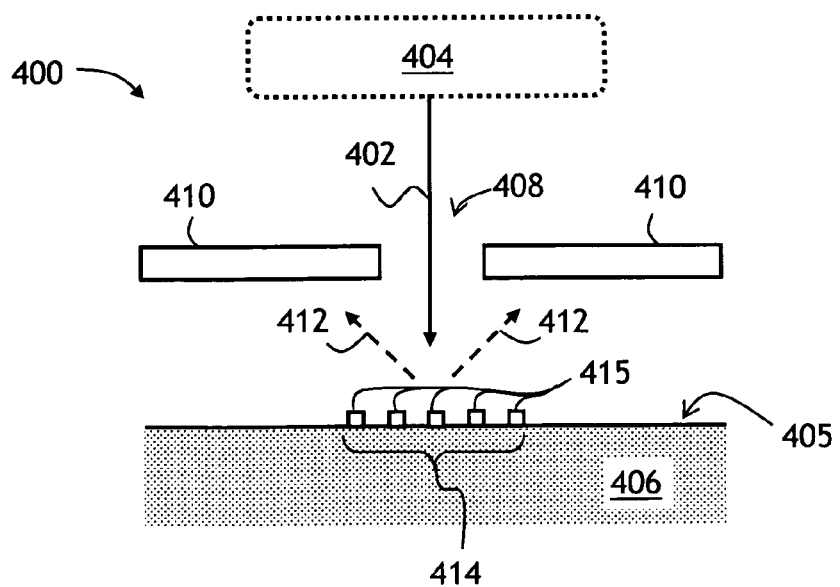
FIG. 4 is a cross-sectional side view of a MEMS micromirror device having an $SiO_2$ diffractive pattern on Si substrate.

Referring now to FIG. 4, an embodiment of a MEMS micromirror device 400 of the present invention is shown in a cross-sectional side view, wherein the device 400 comprises a silicon MEMS substrate 406 and MEMS micromirrors 410 disposed over the substrate 406. A diffractive pattern 414 has silicon oxide structures 415 on a top surface 405 of the silicon substrate 406. The silicon oxide structures 415 are produced by etching through a silicon oxide layer of a pre-defined thickness thermally grown on the top surface 405 of the silicon substrate 406. More details on exemplary embodiments of methods of manufacture of silicon oxide diffractive structures will be provided in the forthcoming paragraphs.

In operation, light 402 originating from an optical system 404 leaks through a gap 408 between micromirrors 410 and falls onto the diffractive pattern 414, which diffracts the light 402 into light beams 412 propagating towards the micromirrors 410, away from the gap 408. The diffraction occurs because light waves reflected from the etched and the non-etched portions of the diffractive pattern 414 are in a counter phase relationship and therefore cancel each other, thereby preventing backreflection of the light 402 through the inter-mirror gap 408 and into the optical system 404.

In the etched regions of the diffractive pattern 414 that only contain air-to-silicon interfaces, the amplitude and phase of a reflected light field are determined in a straightforward manner, according to a well-known optical theory. In the non-etched regions, corresponding to the silicon oxide structures 415, the amplitude and phase of the reflected light field are calculated by taking into account interference between reflections from two interfaces, the air-to-oxide interface at the top of structures 415 and the oxide-to-silicon interface between the structures 415 and the top surface 405 of the substrate 406. The amplitude and the phase of an optical field resulting from such a dual interface can be readily determined through well-known mathematical techniques used in the design of thin film interference filters. For any given substrate and an oxide material, an oxide thickness can be found, such that the reflection of light from the etched and the non-etched regions are out of phase. For example, for the case of silicon dioxide having a refractive index of 1.444 on silicon having an index of refraction of 3.45 at a wavelength of 1.55 microns, an oxide thickness of 0.823 micron provides the desired out-of-phase relationship. The reflection amplitudes will, in general, not be equal in the etched and non-etched regions; however, it is a matter of adjusting the ratio of the areas of the etched and non-etched regions such that the combined reflection amplitudes are equal and therefore cancel each other exactly. For the case of 0.823 micron thick silicon dioxide on silicon, a relative area of 32% etched and 68% non-etched, or the fill factor of 68%, provides the desired cancellation of the backreflected optical field. Other solutions are possible with thicker silicon oxide layers.

Figure 5:
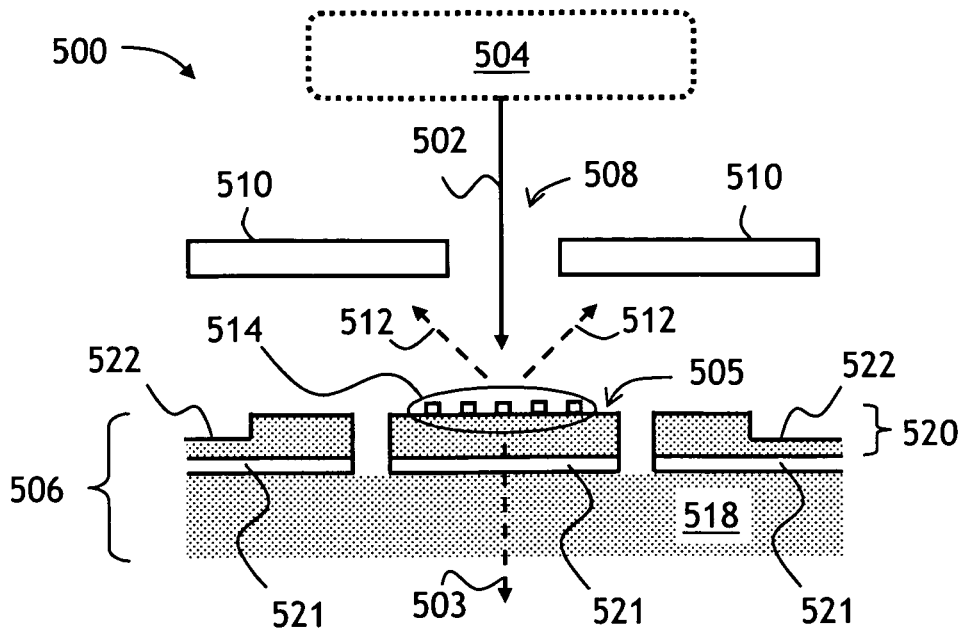
FIG. 5 is a cross-sectional side view of a MEMS micromirror device having an $SiO_2$ diffractive pattern on a silicon-on-insulator (SOI) substrate.

Turning now to FIG. 5, an embodiment of a MEMS micromirror device 500 of the present invention is shown in a cross-sectional side view, wherein the device 500 comprises a MEMS substrate 506 and MEMS micromirrors 510 disposed over the substrate 506. The substrate 506 is a silicon-on-insulator (SOI) substrate comprising a bottom silicon layer 518 and a top silicon layer 520 separated by a buried silicon oxide layer 521. A diffractive pattern 514 has silicon oxide structures on a top surface 505 of the top silicon layer 520. The diffractive pattern 514 is produced by etching through a silicon oxide layer of a pre-defined thickness deposited, preferably thermally grown, on the top surface 505 of the top silicon layer 520. Other structural features, such as electrode structures 522, are patterned in the top silicon layer 520. The main function of the buried oxide layer 521 is to provide an electrical insulation of the top structures, such as the electrode structures 522, from each other and from the bottom silicon layer 518. An additional important function of the buried layer 521, according to the present invention, is for the buried layer 521 to serve as an anti-reflecting layer. Even though the main fraction of light 502 emitted by an optical system 504 and leaked through an inter-mirror gap 508 is diffracted into beams 512, still a beam 503 carrying a fraction of the optical power of the light 502 reaches the layer 521. The thickness t of the buried oxide layer 521 is selected to be $$t = m\lambda_0/4n,$$  Condition (1)

wherein m is an integer odd number, $\lambda_0$ is a central wavelength of the light 502 in vacuum, and n is the refractive index of the buried oxide layer 521 at $\lambda_0$. Condition (1) is a condition for a quarter-wave antireflection layer for reducing reflection of the beam 503 back into the optical system 504. The thickness of the buried oxide layer 521 has to be large enough to prevent a dielectric breakdown of said layer. Thermally grown oxide layers have bulk dielectric strength of 1000 V/micron, so a quarter-wave thickness is usually sufficiently thick to avoid dielectric breakdown.

The MEMS micromirror device 500 of FIG. 5 can be manufactured according to a following Method 1 of the present invention:

Method 1

(a) providing the SOI substrate 506 having the buried silicon oxide layer 521 sandwiched between the two silicon layers 518 and 520, the thickness of the buried silicon oxide layer 521 having to satisfy Condition (1) above;

(b) thermally growing a silicon oxide layer of a pre-determined thickness, e.g. 0.823 micron, on the top silicon layer 520;

(c) patterning and etching said silicon oxide layer, so as to create the required diffractive pattern 514 having an appropriate fill factor for cancelling backreflections, e.g. 68%;

(d) masking the diffractive pattern using an overlayer mask on top of the diffractive pattern 514 before processing the MEMS substrate further, e.g. before fabricating the electrode structures 522; and (e) fabricating the plurality of micromirrors 510 and placing the micromirrors over the top surface of the MEMS substrate 506.

Figure 6:
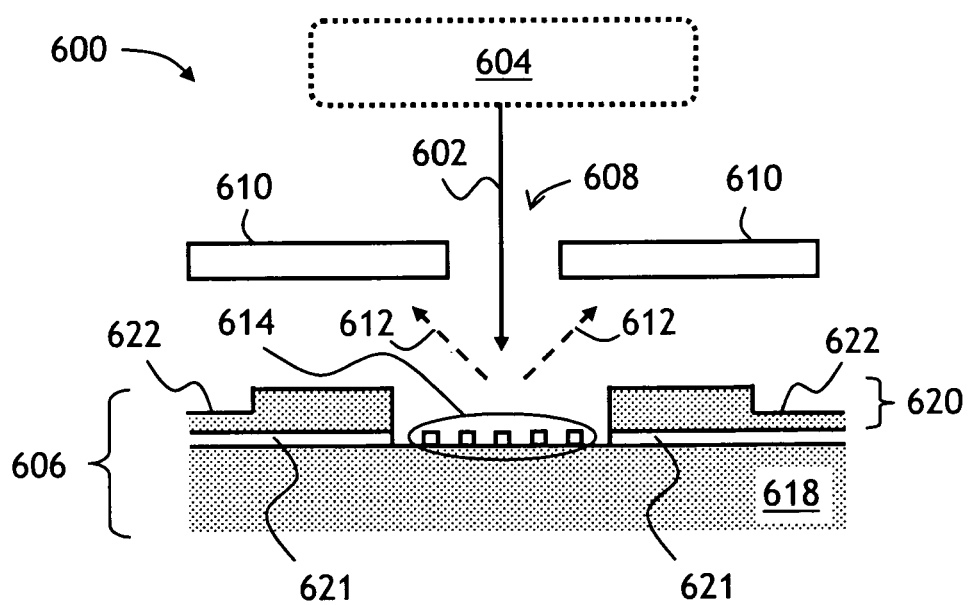
FIG. 6 is a cross-sectional side view of a MEMS micromirror device having a diffractive pattern in a buried $SiO_2$ layer of a SOI substrate.

Referring now to FIG. 6, an embodiment of a MEMS micromirror device 600 of the present invention is shown in a cross-sectional side view, wherein the device 600 comprises a SOI MEMS substrate 606 and MEMS micromirrors 610 disposed over the substrate 606. The substrate 606 comprises a bottom silicon layer 618 and a top silicon layer 620 separated by a buried silicon oxide layer 621. A diffractive pattern 614 is produced by etching through the top silicon layer 620, so as to expose the silicon oxide layer 621, and patterning the silicon oxide layer 621 on the top surface of the bottom silicon layer 618. Other structural features, such as electrode structures 622, are patterned in the top silicon layer 620.

In operation, light 602 emitted by an optical system 604 leaks through a gap 608 between the MEMS micromirrors 610 is diffracted as beams 612 thereby suppressing backreflection of the light 602 back through the gap 608 into the optical system 604 by directing the diffracted beams 612 away from the gap 608 between the micromirrors 610.

The MEMS micromirror device 600 of FIG. 6 can be manufactured according to the following Method 2 of the present invention:

Method 2

(a) providing a SOI substrate for use as the MEMS substrate 606, wherein said SOI substrate has the buried silicon oxide layer 621 having a pre-determined thickness corresponding to the thickness of the diffractive pattern 614;

(b) etching the substrate 606, so as to fabricate the electrode pattern 622 and expose the buried silicon oxide layer 621 for subsequent processing of said layer 621;

(c) upon completion of step (b), patterning and etching the buried silicon oxide layer 621, so as to create the diffractive pattern 614; and (d) fabricating the micromirrors 610 and placing the micromirrors over the top surface of the MEMS substrate 606.

In the Method 2, step (c) involves a deep-level lithography of the substrate 606 that already has a significant topography thereon created at step (b), such as electrode pattern 622. To avoid the deep-level lithography step, an alternative Method 3 can be used to manufacture the MEMS micromirror device 600 of FIG. 6, as follows:

Method 3

(a) providing a silicon substrate that will serve as the bottom layer 618 of the MEMS substrate 606;

(b) thermally growing the silicon oxide layer 621 on the top surface of the bottom layer 618. The layer 621 is grown to a pre-determined thickness corresponding to the thickness of the diffractive pattern 614;

(c) patterning and etching the silicon oxide layer 621, so as to create the diffractive pattern 614 on the top surface of the layer 618;

(d) bonding the silicon layer 620 to the silicon oxide layer 621 at the top of the bottom substrate 618. The layer 620 can be optionally polished down after bonding, to arrive at a required thickness of the layer 620;

(e) etching through the layer 620, so as to expose the diffractive pattern 614 as shown in FIG. 6, and fabricating the electrodes 622, thereby forming the substrate 606; and (f) fabricating the micromirrors 610 and placing the micromirrors over the top surface of the MEMS substrate 606.

Figure 7:
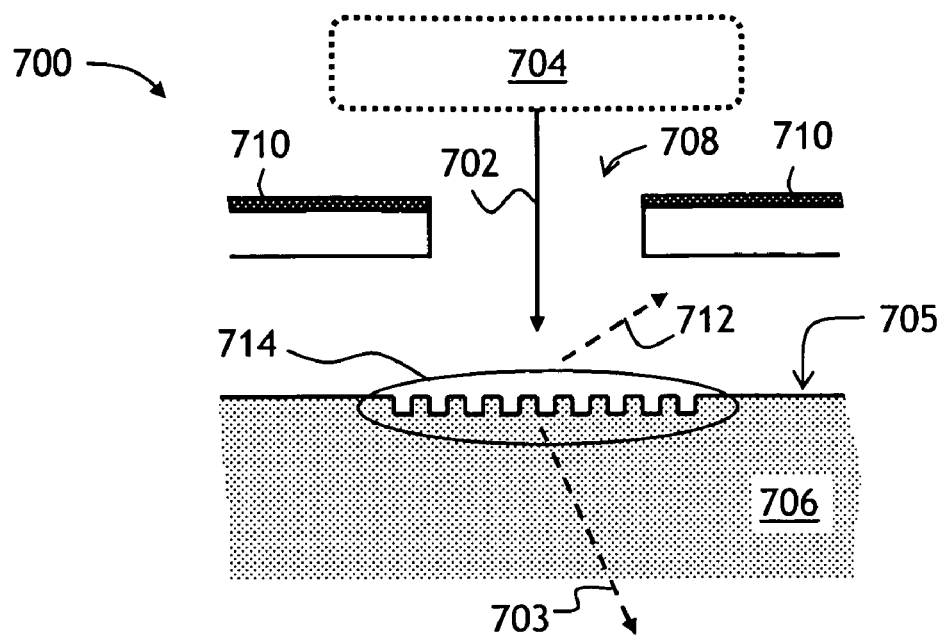
FIG. 7 is a cross-sectional side view of a MEMS micromirror device having a sub-wavelength surface-relief diffraction grating.

Turning now to FIG. 7, a cross-sectional side view of a MEMS micromirror device 700 employing a sub-wavelength diffracting pattern is shown. The device 700 has MEMS micromirrors 710 supported by a MEMS substrate 706 having a sub-wavelength surface-relief diffracting pattern 714, preferably a sub-wavelength grating, on a top surface 705 of said substrate 706. In operation, a light beam 702 emitted by an optical system 704 passes through a gap 708 between the mirrors 710 and impinges on the diffracting pattern 714 on the surface 705 of the MEMS substrate 706. Preferably, the effective optical thickness of the diffracting pattern 714, that is, the thickness of the pattern 714 multiplied by the effective refractive index of the pattern 714, is selected so that the sub-wavelength diffracting pattern 714 acts as a quarter-wave anti-reflective layer for the beam 704. The appropriate parameters of the sub-wavelength diffractive pattern 714 such as pattern depth, feature size, and duty cycle, defining the effective refractive index of the pattern 714, can be found from a corresponding theory known to those skilled in the art. Further, preferably, the duty cycle of the diffractive pattern 714 varies along the top surface 705, so as to suppress the backreflection by properly directing a diffracted light so that it cannot reach the gap 708 between the micromirrors 710. The term "diffracted light" means a reflected light beam 712, or the light beam 712 diffracted into zeroth reflective order of diffraction, and a transmitted light beam 703, or the light beam 703 diffracted into zeroth transmissive order of diffraction. Note that the transmitted beam 703 is also deviated from a normal propagation represented by the beam 702, so the beam 703 cannot reach the gap 708 after reflecting from the bottom surface, not shown, of the substrate 706.

Using sub-wavelength diffractive patterns for suppressing backreflection from a MEMS substrate is highly advantageous. The diffractive pattern 714 is usually more shallow than a conventional diffractive pattern for diffraction of light into a non-zeroth order of diffraction, and a shallower pattern is easier to fabricate. A reactive ion etching (RIE) method can be conveniently used to etch the substrate 706 that can be made of silicon or a glass. Further, due to absence of non-zeroth orders of diffraction, a significant freedom of choosing a direction of the diffracted beams 712 and 703 is achieved. Indeed, as has been noted above, the optical phase of both the reflected light 712 the transmitted light 712 can be varied across the surface via a local duty cycle change, such that the zeroth orders of diffraction can be "steered", for example, to a light block, not shown, positioned on the MEMS substrate 706.

Figure 8:
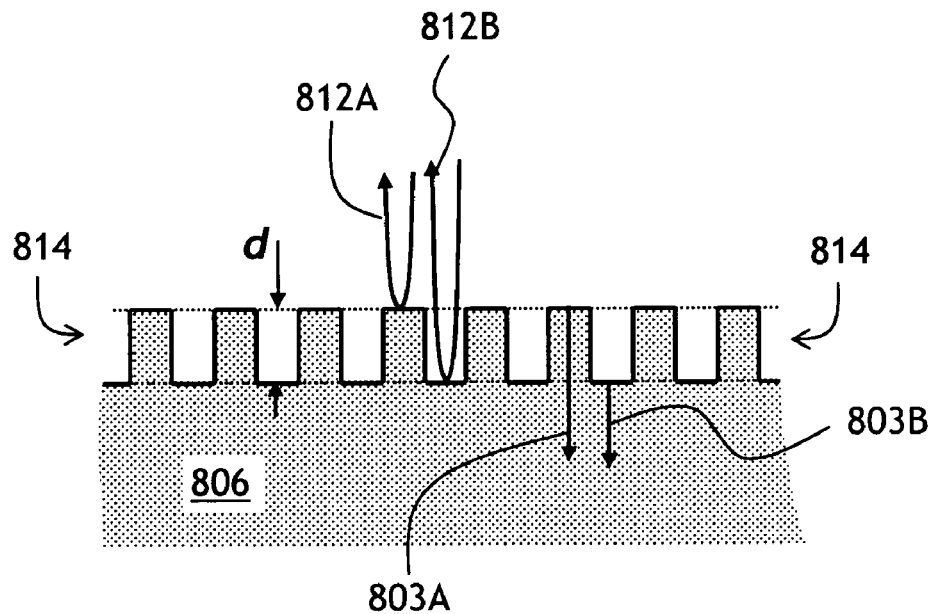
FIG. 8 is a cross-sectional side view of a MEMS substrate having a surface-relief diffractive pattern with simultaneous suppression of transmissive and reflective zero orders of diffraction.

Referring now to FIG. 8, another embodiment of a diffractive pattern of the present invention is shown. In FIG. 8, a cross-sectional side view of a MEMS substrate 806 is depicted, said substrate 806 having a surface-relief diffractive pattern, preferably a surface-relief diffraction grating 814 having straight lines, with simultaneous suppression of transmissive and reflective zeroth orders of diffraction of light impinging thereon. The simultaneous suppression of both said orders of diffraction is advantageous since a light beam going in the direction of the transmitted order of diffraction can reflect from a bottom surface of the MEMS substrate and pass again through the inter-mirror gap.

Structurally, the diffractive pattern 814 of FIG. 8 reminds the pattern 214 of FIG. 2B and the pattern 714 of FIG. 7 in that the pattern 814 of FIG. 8 is a binary surface-relief pattern etched in the substrate 806. However, depth d of the surface-relief pattern 814, herein termed the "relief depth", and the refractive index n of the substrate 806 are chosen so as to suppress both the reflected and the transmitted zeroth orders of diffraction of light, as follows.

The reflected zeroth order of diffraction is formed by a light 812A reflected from the top of the diffractive pattern 814, and by a light 812B reflected from the bottom of the pattern 814. The reflected zeroth order of diffraction will be suppressed when the light waves 812A and 812B have equal amplitudes and opposite phases, that is when $$\text{Duty cycle}=50\%; \quad 2d=m\lambda_0/2 \qquad \text{Condition (2)},$$

where m is an odd integer and $\lambda_0$ is the central wavelength.

The transmitted zeroth order of diffraction is formed by light 803A that has entered the substrate at the top of the diffractive pattern 814 and a light 803B that has entered the substrate at the bottom of the pattern 814. The transmitted zeroth order of diffraction will be suppressed when the light waves 803A and 803B have equal amplitudes and opposite phases, or when $$\text{Duty cycle}=50\%; \quad d(n-1)=m\lambda_0/2 \qquad \text{Condition (3)},$$

where n is the refractive index of the diffractive pattern material at $\lambda_0$.

The Conditions (2) and (3) are satisfied simultaneously when n=3 and $d=m\lambda_0/4$. Therefore, a MEMS substrate with a rather high index of refraction of close to 3 is required to satisfy those conditions. Fortunately, silicon has an index of refraction of 3.45 at a telecommunications wavelength of 1.55 microns, therefore silicon becomes a very attractive substrate material for diffraction gratings with simultaneous suppression of reflected and transmitted zeroth orders of diffraction. Of course, the thickness d can be adjusted to satisfy the Conditions (2) and (3) simultaneously as well as possible, in view of the index of refraction being not exactly equal to 3. A practical range of indices of refraction is from 2.5 to 3.5.

Figure 9:
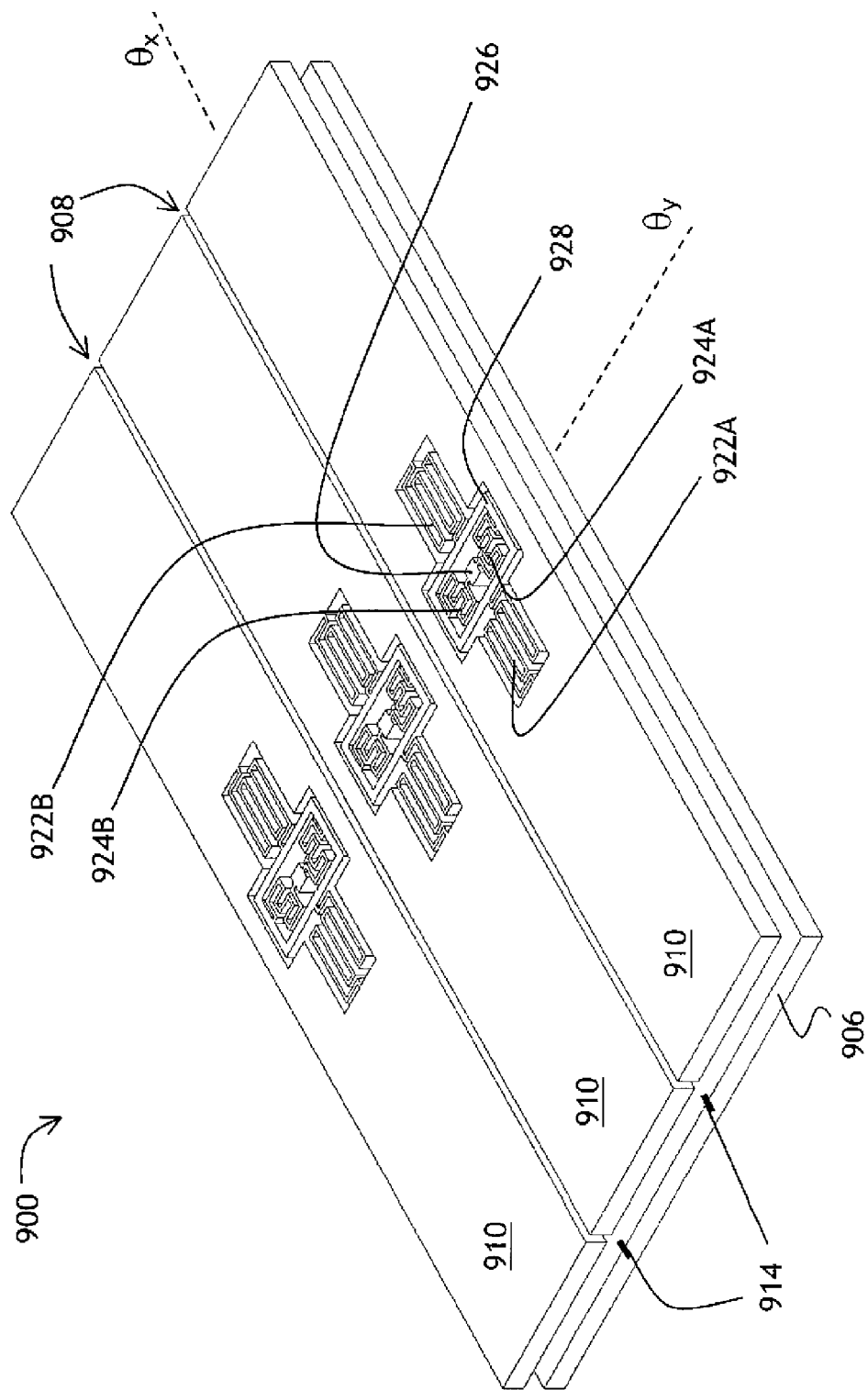
FIG. 9 is a three-dimensional view of a MEMS micromirror array having a diffractive pattern of the present invention.

Turning now to FIG. 9, a three-dimensional view of a planar MEMS micromirror array 900 is shown having a substrate 906 and micromirrors 910 suspended over the substrate 906 with a first pair of serpentine torsional hinges 922A and 922B for pivoting the micromirrors 910 about a first axis of rotation $\theta_x$, and a second pair of serpentine torsional hinges 924A and 924B for rotating the micromirrors 910 about a second axis of rotation $\theta_y$ above the substrate 906. The second pair of serpentine torsional hinges 924A and 924B extend from a single anchor post 926, which extends upwardly from the substrate 906 through a center of the micromirror 910, i.e. at the intersection of the first and the second axes $\theta_x$ and $\theta_y$ thereof. Outer ends of the second pair of serpentine torsional hinges 924A and 924B are connected to a rectangular gimbal ring 928 at points along the second axis ($\theta_y$) of the micromirror 910. The rectangular gimbal ring 928 surrounds the second pair of serpentine hinges 924A and 924B. The first pair of serpentine torsional hinges 922A and 922B extend from opposite sides of the gimbal ring 928 into contact with the micromirror 910, at points along the first axis ($\theta_x$) of the micromirror 910. Diffracting patterns 914 are disposed on the substrate 906 in gaps 908 between the micromirrors 910. Preferably, diffracting patterns 914 are also disposed under the hinge structures 922A, B and 924A, B.

What is claimed is:

1. A MEMS micromirror device comprising:
    a MEMS substrate having at least one layer, wherein the MEMS substrate has a top surface;
    a plurality of micromirrors for reflecting light impinging thereon, wherein said light has a central wavelength $\lambda_0$, wherein the micromirrors are supported by the MEMS substrate and disposed over the top surface of the MEMS substrate, and
    wherein gaps exist between the micromirrors; and
    a diffractive pattern for suppressing backreflection of light leaking through the gaps between the micromirrors and impinging onto the top surface of the MEMS substrate, by diffracting said leaking light,
        wherein the diffractive pattern is disposed on or within the top surface of the MEMS substrate, and
        wherein the diffractive pattern encompasses at least 80% of an area formed by a normal projection of the gaps between the micromirrors onto the MEMS substrate.

2. A MEMS micromirror device of claim 1, wherein the diffractive pattern is constructed to suppress said backreflection by directing the diffracted light away from the gaps between the micromirrors.

3. A MEMS micromirror device of claim 1, wherein the diffractive pattern comprises lines running parallel to the gaps.

4. A MEMS micromirror device of claim 1, wherein the diffractive pattern comprises lines running perpendicular to the gaps.

5. A MEMS micromirror device of claim 1, wherein the diffractive pattern is a surface-relief diffraction grating.

6. A MEMS micromirror device of claim 1,
    wherein the at least one layer is a first silicon layer, the top surface of the MEMS substrate having a common surface area with a top surface of said first silicon layer;
    wherein the diffractive pattern is disposed in said common surface area; and
    wherein the diffractive pattern comprises silicon oxide structures on the top surface of said first silicon layer.

7. A MEMS micromirror device of claim 6, wherein the silicon oxide structures have a height of 0.823+−0.05 micron as measured from the top surface of the first silicon layer, and wherein a geometric area occupied by the silicon oxide structures on said top surface is 68%+−10% of a total geometric area occupied by the diffractive pattern on said top surface of the first silicon layer.

8. A MEMS micromirror device of claim 6, wherein said MEMS substrate further comprises a buried silicon oxide layer disposed under the first silicon layer, wherein the buried silicon oxide layer has a thickness of $m\lambda_0/4n$, wherein m is an integer odd number and n is refractive index of the buried silicon oxide layer at $\lambda_0$.

9. A method of manufacturing of a MEMS micromirror device of claim 6, comprising:
    (a) providing the MEMS substrate;
    (b) growing a silicon oxide layer of a pre-determined thickness on the first silicon layer of said MEMS substrate;
    (c) patterning and etching said silicon oxide layer, so as to create the silicon oxide structures;
    (d) masking the silicon oxide structures using an overlayer mask on top of the silicon oxide structures before processing the MEMS substrate any further; and
    (e) fabricating the plurality of micromirrors and placing the micromirrors over the top surface of the MEMS substrate.

10. A method of claim 9, wherein in step (a), the MEMS substrate is a silicon-on-insulator substrate having a buried silicon oxide layer having a thickness of $m\lambda_0/4n$, wherein m is an integer odd number, and n is refractive index of the buried oxide layer at $\lambda_0$.

11. A method of manufacturing of a MEMS micromirror device of claim 6, comprising:
    (a) providing a silicon-on-insulator (SOI) substrate for use as the MEMS substrate, wherein said SOI substrate has a buried silicon oxide layer;
    (b) etching the SOI substrate, so as to expose the buried silicon oxide layer;
    (c) upon completion of step (b), patterning and etching said silicon oxide layer, so as to create the silicon oxide structures; and
    (d) fabricating the plurality of micromirrors and placing the micromirrors over the top surface of the MEMS substrate.

12. A method of manufacturing of a MEMS micromirror device of claim 6, comprising:
    (a) providing the first silicon layer;
    (b) growing a silicon oxide layer of a pre-determined thickness on the top surface of the first silicon layer;
    (c) patterning and etching said silicon oxide layer, so as to create the silicon oxide structures on the top surface of the first silicon layer;
    (d) bonding a second silicon layer to the silicon oxide layer, thereby forming a stack of the first silicon layer at a bottom of the stack, the silicon oxide layer, and the second silicon layer at a top of the stack;
    (e) exposing the silicon oxide structures by etching through the second silicon layer, thereby forming the MEMS substrate; and
    (f) fabricating the plurality of micromirrors and placing the micromirrors over the top surface of the MEMS substrate.

13. A MEMS micromirror device of claim 1, wherein the diffractive pattern is a sub-wavelength grating having a period smaller than $\lambda_0$.

14. A MEMS micromirror device of claim 13, wherein the sub-wavelength grating has a thickness of $m\lambda_0/4n$, wherein m is an integer odd number and n is effective refractive index of the sub-wavelength grating at $\lambda_0$.

15. A MEMS micromirror device of claim 13, wherein the sub-wavelength grating has a duty cycle varying along the top surface, so as to suppress said backreflection by directing the diffracted light away from the gaps between the micromirrors.

16. A MEMS micromirror device of claim 1, wherein said diffractive pattern is for suppressing light diffracted into a zeroth reflective order of diffraction.

17. A MEMS micromirror device of claim 16, wherein said diffractive pattern is also for suppressing light diffracted into a zeroth transmissive order of diffraction.

18. A MEMS micromirror device of claim 17, wherein said diffractive pattern has a feature size that is capable of providing a first order of diffraction of said light, and wherein the diffractive pattern is constructed to make the light diffracted into said first order propagate in a direction pointing away from the gaps between the micromirrors.

19. A MEMS micromirror device of claim 18, wherein said diffractive pattern is a surface-relief diffraction grating on the top surface of the MEMS substrate having a refractive index of 2.5 to 3.5 at $\lambda_0$, wherein said surface-relief grating has a relief depth of $m\lambda_0/4$, wherein in is an integer odd number.

20. A MEMS micromirror device of claim 19, wherein the MEMS substrate is a silicon substrate.

* * * * *